(12) United States Patent
Gorshenin

(10) Patent No.: US 11,402,037 B2
(45) Date of Patent: Aug. 2, 2022

(54) PIPE STRUCTURE HAVING A FOAM CORE

(71) Applicant: North American Pipe Corporation, Houston, TX (US)

(72) Inventor: Alexander Gorshenin, Philadelphia, PA (US)

(73) Assignee: NORTH AMERICAN PIPE CORPORATION, Houston, TX (US)

( * ) Notice: Subject to any disclaimer, the term of this patent is extended or adjusted under 35 U.S.C. 154(b) by 73 days.

(21) Appl. No.: 16/932,391

(22) Filed: Jul. 17, 2020

(65) Prior Publication Data

US 2021/0018117 A1    Jan. 21, 2021

Related U.S. Application Data

(60) Provisional application No. 62/876,364, filed on Jul. 19, 2019.

(51) Int. Cl.
| | |
|---|---|
| *F16L 9/12* | (2006.01) |
| *B32B 5/18* | (2006.01) |
| *B32B 1/08* | (2006.01) |
| *B32B 27/30* | (2006.01) |
| *B32B 27/06* | (2006.01) |

(52) U.S. Cl.
CPC ............ *F16L 9/121* (2013.01); *B32B 1/08* (2013.01); *B32B 5/18* (2013.01); *B32B 27/065* (2013.01); *B32B 27/304* (2013.01); *B32B 2307/558* (2013.01); *B32B 2597/00* (2013.01)

(58) Field of Classification Search
CPC .... F16L 9/21; F16L 9/121; B32B 5/18; B32B 27/065; B32B 2597/00
USPC .......................... 138/138, 140, 141, 148, 149
See application file for complete search history.

(56) References Cited

U.S. PATENT DOCUMENTS

| | | | | |
|---|---|---|---|---|
| 4,590,971 | A * | 5/1986 | Webster | F16L 59/143 |
| | | | | 138/149 |
| 5,795,634 | A * | 8/1998 | Fukui | B32B 1/08 |
| | | | | 428/36.1 |
| 5,806,567 | A * | 9/1998 | Fukui | F24F 13/0263 |
| | | | | 138/132 |
| 6,079,452 | A * | 6/2000 | Touzel | F16L 59/028 |
| | | | | 138/149 |
| 6,176,269 | B1 * | 1/2001 | Jarvenkyla | B29C 48/3366 |
| | | | | 138/143 |
| 2015/0233518 | A1 * | 8/2015 | Keyes | F16L 59/10 |
| | | | | 138/149 |

* cited by examiner

*Primary Examiner* — Patrick F Brinson
(74) *Attorney, Agent, or Firm* — Lempia Summerfield Katz LLC

(57) ABSTRACT

A pipe structure has an outer layer of a skin material with a first thickness and which defines an outside diameter of the pipe structure. The pipe structure has an inner layer of a skin material with a second thickness and which defines an inside diameter of the pipe structure. The pipe structure has a core layer of a foam material disposed between the inner and outer layers and having a third thickness. The inner, outer, and core layers are formed such that the pipe structure has a tube shape in cross-section. The first, second, and third thicknesses, respectively, combine to define a wall thickness of the pipe structure. The pipe structure has improved cold impact performance according to the ratio of the thicknesses of the inner and outer layers relative to the core layer.

19 Claims, 2 Drawing Sheets

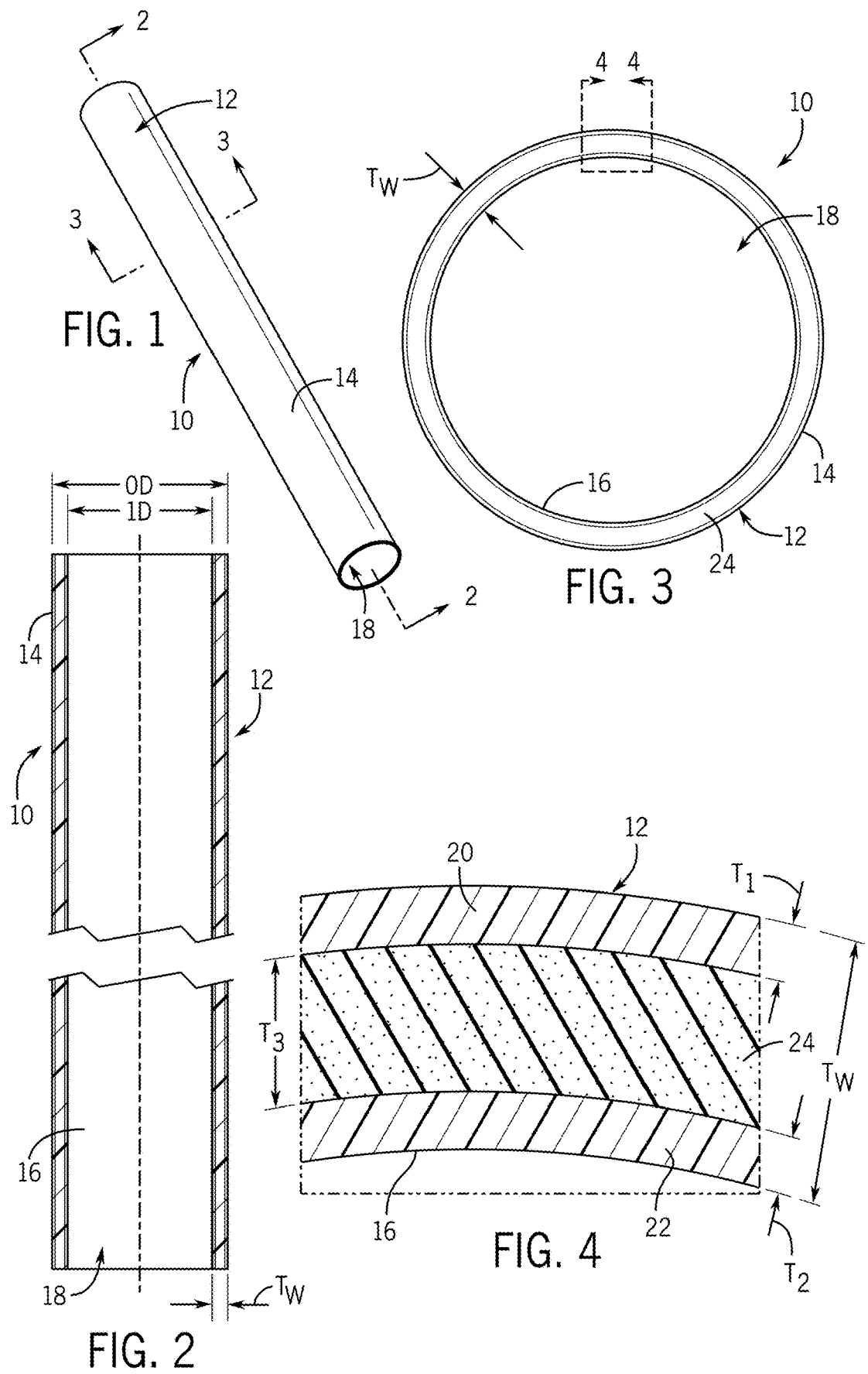

PIPE STRUCTURE HAVING A FOAM CORE

RELATED APPLICATION DATA

This patent is entitled to the benefit of and claims priority to U.S. Provisional Application Ser. No. 62/876,364 filed Jul. 19, 2019 and entitled "Pipe Structure Having a Foam Core." The entire contents of this prior filed application are hereby incorporated herein by reference.

BACKGROUND

1. Field of the Disclosure

The present disclosure is generally directed to pipe structures, and more particularly to a pipe structure having a foam core.

2. Description of Related Art

It has become common to employ different types of plastic pipe for pressurized fluid systems, low pressure systems, and no pressure systems and installations. Such use includes residential and commercial plumbing installations, municipal water and sewer systems, industrial installations, and the like. One common plastic material that is used for such pipe structures is poly(vinyl chloride) or PVC. Another somewhat common plastic material that is used for such pipe structures is acrylonitrile butadiene styrene or ABS. The typical PVC or ABS pipe structure is a solid core, i.e., solid structure. In other words, the pipe has a monolithic solid PVC or ABS layer material wall having a wall thickness and defining both the inner and outer surfaces of the pipe structure. Such plastic pipe structures have become very widely used.

It has also more recently become somewhat common to use a foam core pipe material for non-pressure portions of such installations, such as the gravity fed waste systems including drain lines, vents, and waste lines. A foam core pipe structure typically includes an inner skin layer and an outer skin layer of a plastic material. The inner plastic layer defines the inside diameter or ID of the pipe and the outer plastic layer defines the outside diameter or OD of the pipe structure. A cellular layer, i.e., a foam layer or core layer is sandwiched between the inner and outer plastic skin layers. The inner and outer plastic layers are typically formed of a PVC, ABS, or other similar plastic material. The cellular core or foam layer is a foamed plastic material, such as closed cell foamed PVC. Foam core pipe is less expensive based on raw material usage and is lighter in weight that conventional solid core plastic pipe.

The existing foam core pipe structures typically have a thicker inner skin layer than the outer skin layer. The existing foam core pipes also have a fairly low ration of the combined thicknesses of the skin layers to the foam core layer. The existing foam core pipe structures are typically not strong enough for vertical usage where the vertical rise is more than a few stories. Further, the existing foam core pipe structures, specifically the PVC foam core pipes, are typically not strong or durable enough for cold weather usage and do not meet Canadian performance standards for such pipe, which require certain cold weather performance characteristics. Thus, these types of foam core pipe structures have a relatively limited use for zero-pressure installations and further have only a limited range of use within such installations.

SUMMARY

In one example, according to the teachings of the present disclosure, a pipe structure includes an outer layer of a skin material having a first thickness. The outer layer defines an outside diameter of the pipe structure. The pipe structure has an inner layer of a skin material having a second thickness. The inner layer defines an inside diameter of the pipe structure. The pipe structure has a core layer of a foam material disposed between the inner and outer layers. The core layer has a third thickness. The inner, outer, and core layers are formed such that the pipe structure has a tube shape in cross-section. The first, second, and third thicknesses, respectively, of the outer, inner, and core layers combine to define a wall thickness of the pipe structure. The pipe structure has improved cold impact performance which may result from the ratio of the thicknesses of the inner and outer layers relative to the core layer.

In one example, the inside diameter can be two (2) inches or less and a ratio of the first thickness plus the second thickness compared to the third thickness can be between about 40/60 and 50/50. The pipe structure can also have a specific gravity of at least 1.10 but substantially less than 1.4.

In one example, the ratio can be about 45/55.

In one example, a formulation of the skin material of the inner and outer layers can have at least two (2) parts per hundred resin (PHR) of an impact modifier.

In one example, the pipe structure can be formed according to the dimensional and/or other requirements of ASTM F3128.

In one example, the inside diameter can be greater than two (2) inches and a ratio of the first thickness plus the second thickness compared to the third thickness can be about 30/70 and 40/60. The pipe structure can also have a specific gravity of at least 1.0 but substantially less than 1.4.

In one example, the ratio can be about 33/67.

In one example, a formulation of the skin material of the inner and outer layers can have at least one (1) PHR of an impact modifier.

In one example, the tube shape can be round or circular.

In one example, a ratio of the thickness of the inner layer compared to the thickness of the outer layer of skin material can be about 1 to 1.

In one example, a ratio of the thickness of the inner layer compared to the thickness of the outer layer of skin material can be less than 1 to 1.

In one example, a degree of fusion of the material of at least the inner and outer layers of skin material can be between about 70% and about 90%.

In one example, a degree of fusion of the material of the core layer can be between about 70% and about 90%.

In one example, a degree of fusion of the material of each of the core layer and the inner and outer layers of skin material can be between about 70% and about 90%.

In one example, the skin material of the inner and outer layers can be poly(vinyl chloride) (PVC).

In one example, the foam material of the core layer can be a closed-cell PVC foam.

In one example, the pipe structure can be formed according to the dimensional and/or other requirements of ASTM F628.

BRIEF DESCRIPTION OF THE DRAWINGS

The drawings provided herewith illustrate one or more examples or embodiments of the disclosure and therefore should not be considered as limiting the scope of the disclosure. There may be other examples and embodiments that may be equally effective to achieve the objectives and that may fall within the scope of the disclosure. Objects, features, and advantages of the present invention will become apparent upon reading the following description in conjunction with the drawing figures, in which:

FIG. 1 shows a perspective view of one example of a foam core pipe constructed in accordance with the teachings of the present disclosure.

FIG. 2 shows a lengthwise cross-section taken along line 2-2 of the foam core pipe of FIG. 1.

FIG. 3 shows a widthwise cross-section taken along line 3-3 of the foam core pipe of FIG. 1.

FIG. 4 shows an enlarged portion of the cross-section of the foam core pipe taken from line 4-4 of the foam core pipe of FIG. 3.

DETAILED DESCRIPTION OF THE DISCLOSURE

Figure 5:
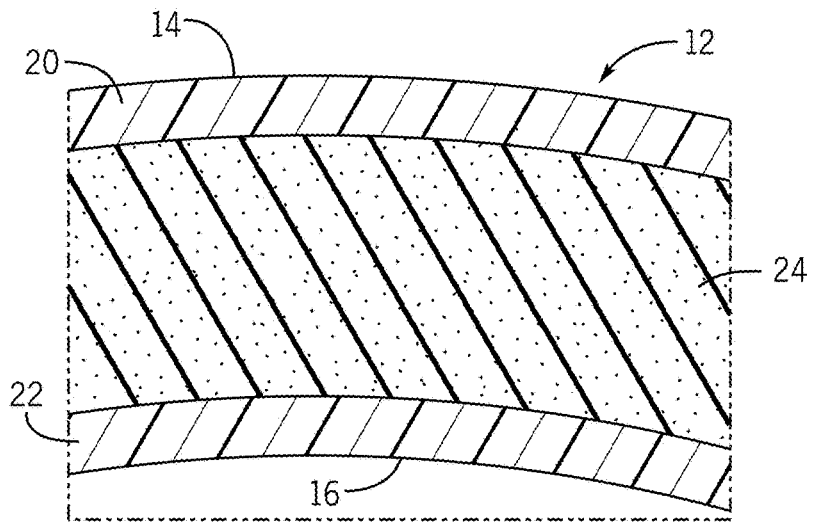
FIGS. 5-7 show cross-sections of different examples of a foam core pipe, similar to FIG. 4 and constructed in accordance with the teachings of the present disclosure.

The disclosed foam core pipe structures solve or improve upon the above-noted and/or other problems and disadvantages with prior known foam core pipe structures. In one example, the disclosed foam core pipe structures may have inner and outer skin layer wall thicknesses that are about equal or have a thicker outer skin layer than inner skin layer. In one example, the disclosed foam core pipe structures may have a specific ratio of foam core material thickness to combined inner and outer skin layer material thickness of about 45/55 for smaller diameter pipe and 33/67 for larger diameter pipe. In one example, the disclosed foam core pipe structures can have a combined specific gravity of at least 1.0 but well below 1.4, which is the specific gravity of existing monolithic plastic pipe. In one example, the disclosed foam core pipe structures can include at least 1 part per hundred resin (PHR) of an acrylic based impact modifier. In the disclosed examples, the various structural properties can be varied and tuned to provide desired performance characteristics, depending on pipe diameter, that are substantially improved as compared to the known foam core pipe structures. These and other objects, features, and advantages of the disclosed pipe structure should become apparent to those having ordinary skill in the art upon reading this disclosure.

Turning now to the drawings, FIG. 1 shows a view of a pipe 10 made form a plastic material, which can have a foam core structure in accordance with the teachings of the present disclosure. In this example, an extended length of pipe substrate can be formed, which can then be cut to desired lengths of pipe 10 in a lengthwise or axial direction. As shown in FIGS. 2 and 3, the pipe 10 can have a tubular cross-section shape. FIG. 2 shows a lengthwise cross-section of the pipe 10 and FIG. 3 shows a widthwise cross-section of the pipe 10. The pipe 10 can have a tubular shaped wall 12 with an outer surface 14 that defines an outside diameter or OD and an inner surface 16 that defines an inside diameter or ID of the pipe. The pipe wall 12 also has a wall thickness $T_w$ between the outer and inner surfaces 14, 16. The inner surface 16 of the pipe wall 12 defines an internal through bore or opening 18 along the lengthwise axis. In one example, the tube or tubular shape can be round or circular, as is most common in the art. The ID of the pipe wall 12 typically defines the size of the pipe 10, i.e., the diameter of the bore or opening 18, such as a 1-inch pipe, a 1.5-inch pipe, a 2-inch pipe, a 3-inch pipe, a 6-inch pipe, or the like. The OD of the pipe wall 12 is dependent on the ID and on the pipe wall thickness $T_w$.

As shown in FIGS. 2-4, the foam core structure of the pipe 10 has an outer layer 20 of a skin material. The outer layer 20 has a first thickness $T_1$, and an exterior surface of the outer layer is the outer surface 14 of the pipe 10 and defines the OD of the pipe structure. The foam core structure of the pipe 10 also has an inner layer 22 of a skin material. The inner layer 22 has a second thickness $T_2$, and an interior surface of the inner layer is the inner surface 16 of the pipe 10 and defines the ID of the pipe structure. The pipe structure, i.e., the foam core structure of the pipe 10 further has a core layer 24 of a foam or foamed material. The core layer 24 is disposed between the outer and inner skin layers 20 and 22 and has a third thickness $T_3$.

The inner layer 22, the outer layer 20, and the core layer 24 are formed to define the pipe wall 12 and together are formed in this example to define the tube shape in cross-section of the pipe 10. Again, in one example, the tube or tubular shape of the pipe 10 can be round or circular, as is most commonly known and used in the art. However, in other examples, the pipe 10 may have a cross-section of a non-round shape, such as an oval shape, a substantially square shape, a substantially rectangular shape, or the like.

The combination of the first thickness $T_1$ of the outer layer 20, the second thickness $T_2$ of the inner layer 22, and the third thickness $T_3$ of the core layer 24, respectively, defines the wall thickness $T_w$ of the pipe wall 12 of the pipe structure. As disclosed and described herein, the foam core structure of the pipe 10 is configured to provide improved cold impact performance compared to known foam core pipe structures while retaining many of the benefits of existing foam core pipe.

In one example, the three layers 20, 22, and 24 may be co-extruded together. The inner and outer skin layers 22, 20 may be formed of a poly(vinyl chloride) (PVC), acrylonitrile butadiene styrene (ABS), or other suitable plastic resin material and may be co-extruded through a die. The foam core layer 24 may also be co-extruded with the inner and outer skin layers 22, 20 through the die. The foam core layer 24 can be formed in a number of different ways. In one example, a foaming agent can be added to the resin material at the die and heat can be employed at the die to activate the foaming agent. In another example, the foaming agent can be added to the resin material in line in the extruder, upstream of the die, and heat can be applied at the extruder or at the die. In another example, a gas can be injected into the resin material between the extruder and the die to foam the resin. The gas can be Nitrogen (N), Carbon Dioxide ($CO_2$), or the like.

In one example, the foam core structure of the pipe 10 can have an ID of two (2) inches or less. In such a pipe size, the ratio of the first thickness $T_1$ (outer layer 20) plus the second thickness $T_2$ (inner layer 22) compared to the third thickness T3 (foam core layer 24), i.e., the ratio of the combined thickness ($T_1+T_2$) of the inner and outer solid layers 22, 20 to the thickness $T_3$ of the foam core layer 24, can be at least about 45 to 55 (45/55) to provide the desired improved cold impact performance. In other examples of pipe sizes of two (2) inches or less, the ration can be between about 40/60 and about 50/50. In such a pipe size, the overall foam core structure of the pipe 10 also can have a specific gravity of at least 1.10, with the reference substance being water having a specific gravity of 1.0. In one example, the ratio should not be much greater than 50/50 and the specific gravity should not approach 1.4 or the benefits of a foam core pipe structure may be substantially reduced. Thus, the specific gravity may be 1.38 or lower in some examples, and about 1.35 or lower in further examples.

In one example, the foam core structure of a pipe 10 having an ID of 2 inches or less can have the same skin material formulation for both the inner and outer layers 22, 20. The skin formulation can include at least two (2) parts per hundred resin (PHR) of an impact modifier. The base material composition of the inner and outer layers 22, 20 can be PVC plastic, ABS plastic, or the like. In this example, the inner and outer layers 22, 20 can be formed of PVC and include the impact modifier. The type of impact modifier can vary. The impact modifier can be a core/shell impact modifier, a rubber-based impact modifier, an acrylic based impact modifier, or the like. The impact modifier can be a butyl acrylate rubber impact modifier, N-Bromo-succinimide (NBS) styrene-based impact modifier, a calcium carbonate ($CaCO_3$), or other such suitable materials.

In one example, the foam core structure of a pipe 10 having a diameter of 2 inches or less can be formed according to the dimensional and/or other requirements of American Society for Testing and Materials (ASTM) standard ASTM F3128 (ASTM F3128-19, Standard Specification for Poly(Vinyl Chloride) (PVC) Schedule 40 Drain, Waste, and Vent Pipe with a Cellular Core, ASTM International, West Conshohocken, Pa., 2019, www.astm.org). This is a standard specification for co-extruded PVC plastic drain, waste, and vent pipe made to Schedule 40 iron pipe sizes (IPS) and produced by a co-extrusion process with concentric inner and outer solid PVC layers 22, 20 and a core layer 24 of a closed-cell cellular PVC. The entire contents of ASTM F3128 standard are incorporated herein by reference.

In one example, the foam core structure of a pipe 10 can have an inside diameter of greater than two (2) inches. In such a pipe size, the ratio of the first thickness $T_1$ plus the second thickness $T_2$ compared to the third thickness $T_3$ can be at least 33/67 to provide the desired improved cold impact performance. In other examples, the ration can be between about 30/70 to about 40/60 for pipe sizes of more than two (2) inches. In such a pipe size, the overall foam core structure of the pipe 10 also has a specific gravity of at least 1.0, with the reference substance again being water having a specific gravity of 1.0. Again, the specific gravity should not approach 1.4.

In one example, the foam core structure of a pipe 10 having a diameter of greater than two (2) inches can again have the same skin material formulation for both the inner and outer layers 22, 20. The skin formulation can include at least one (1) PHR of an impact modifier. The base material composition of the inner and outer layers 22, 20 can again be PVC plastic, ABS plastic, or the like. In this example, the inner and outer layers 22, 20 can again be formed of PVC and include the impact modifier. In one example, the foam core structure of a pipe 10 having a diameter of greater than two (2) inches can again be formed according to the dimensional requirements of the above-noted standard ASTM F3128.

In either of the foregoing examples, the foam core structure of the pipe 10 can be formed to meet the dimensional and/or other requirements of ASTM F891 (ASTM F891-16, Standard Specification for Coextruded Poly(Vinyl Chloride) (PVC) Plastic Pipe With a Cellular Core, ASTM International, West Conshohocken, Pa., 2016, www.astm.org), which is a standard for co-extruded PVC plastic pipe with a cellular core and concentric inner and outer solid layers. The foam core structure of such a pipe 10 can be formed using a multilayer co-extrusion die according to this standard for non-pressure use in three series. These series include an IPS Schedule 40 series, a pipe size (PS) series with an iron pipe size OD with varying wall thickness as required for pipe stiffness of 25, 50, and 100, and a sewer and drain series. The entire contents of the above-noted ASTM F891 standard are incorporated herein by reference.

In one example, the foam core structure of a pipe 10 can be made of ABS plastic according to the dimensional and/or other requirements of ASTM F628 (ASTM F628-12e3, Standard Specification for Acrylonitrile-Butadiene-Styrene (ABS) Schedule 40 Plastic Drain, Waste, and Vent Pipe With a Cellular Core, ASTM International, West Conshohocken, Pa., 2012, www.astm.org). This ASTM standard specification is directed to ABS plastic drain, waste, and vent pipe made to Schedule 40 IPS. This standard is directed to such pipe made by a co-extrusion process with concentric inner and outer solid ABS layers and a core layer of closed-cell cellular ABS. The entire contents of the above-noted ASTM F628 standard are incorporated herein by reference.

In one example, the foam core structure of a pipe 10 can include a ratio of about 1 to 1 (1/1) for the second thickness $T_2$ of the inner layer 22 compared to the first thickness $T_1$ of the outer layer 20 of skin material. In another example, the foam core structure of a pipe 10 can include a ratio of the second thickness $T_2$ of the inner layer 20 compared to the first thickness $T_1$ of the outer layer 20 of skin material that is less than a 1 to 1 ratio. In other words, the outer skin layer 20 may be thicker than the inner skin layer 22.

In one example, the co-extruded material of the inner and outer layers 22, 20, and also the foam core layer 24, can achieve chemical fusion to a predetermined amount to yield desired performance characteristics. The degree of fusion or powder melt of the material layers, including the outer and inner layers 20 22 and the core layer 24, can be between about 70% and 90%. Under-fused material, i.e., approaching 50% fusion can result in poor material performance. Over-fused material, i.e., closer to 100% fusion, damages the material. In one example, over-fused PVC can yield a pipe structure that is too brittle.

The series of images of FIG. 4-7 show partial cross-sections of various examples of pipes 10. The diameter of the pipe 10 may vary, as can the ratio of the combined thicknesses of the skin layers 20, 22 to the thickness of the core layer 24. In one example, such as in FIG. 4, a pipe 10 with a diameter of about 1.5 inches may have a 45/55 ratio of combined solid skin layers 20, 22 ($T_1+T_2$) to foam core layer 24 ($T_3$) with a specific gravity of 1.12 passed each performance test and met the above-mentioned ASTM standards. These tests also included a cold impact test (32 degrees F.), standard temperature and pressure (STP) impact test, and a stiffness test. Foam core structures of pipes with lower ratios, i.e., more core material and less solid layer material did not pass at least one of these tests.

Figure 6:
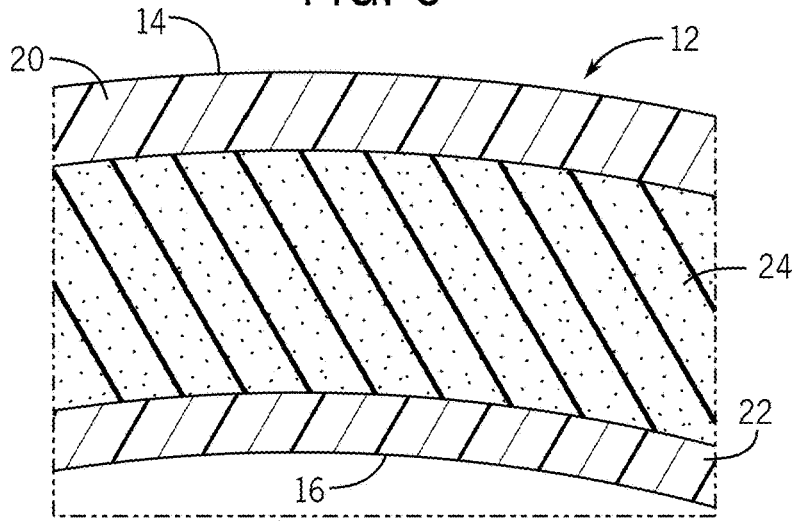
Figure 7:
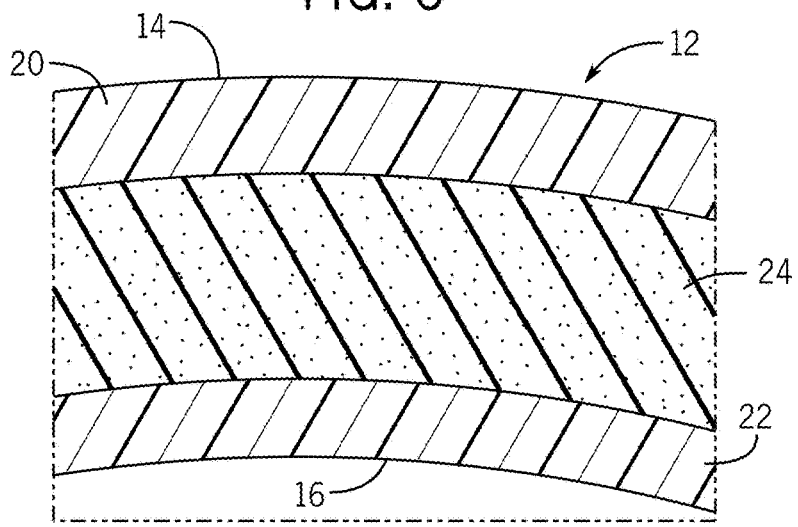

In another example, such as in FIGS. 5-7, a pipe 10 may have a diameter of about three (3) inches. In the example of FIG. 5, the pipe may have a 23/77 ratio of combined solid skin layers 20, 22 ($T_1+T_2$) to foam core layer 24 ($T_3$) with a specific gravity near or below 1.0. Such a pipe 10 did not pass one or more of the performance tests and did not meet the above-mentioned ASTM standards.

In the examples of FIGS. 6 and 7, a three (3) inch pipe may have a specific gravity of about 1.04 and solid layer to core ratios of 33/67 and 36/64, respectively. Each such pipe 10 passed each performance test and met the above-mentioned ASTM standards.

In the above examples, the foam core structures of a pipe 10 can include a core layer 24 formed of a closed-cell foam PVC material. The PVC foam core can be coextruded with the solid inner and outer layers 22, 20, such as PVC material layers, as noted above.

Although certain pipe structures have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A pipe structure comprising:
   an outer layer of a skin material having a first thickness, the outer layer defining an outside diameter of the pipe structure;
   an inner layer of a skin material having a second thickness, the inner layer defining an inside diameter of the pipe structure; and
   a core layer of a foam material disposed between the inner and outer layers, the core layer having a third thickness,
   wherein the inner, outer, and core layers are formed such that the pipe structure has a tube shape in cross-section,
   wherein the first, second, and third thicknesses, respectively, of the outer, inner, and core layers combine to define a wall thickness of the pipe structure,
   wherein the pipe structure has improved cold impact performance,
   wherein the inside diameter is two (2) inches or less,
   wherein a ratio of the first thickness plus the second thickness compared to the third thickness is between about 40/60 and 50/50, and
   wherein the pipe structure has a specific gravity in a range between 1.1 and less than 1.4.

2. The pipe structure of claim 1, wherein the ratio is about 45/55.

3. The pipe structure of claim 1, wherein a formulation of the skin material of the inner and outer layers has at least two (2) parts per hundred resin (PHR) of an impact modifier.

4. The pipe structure of claim 1, wherein the pipe structure is formed according to the dimensional requirements of ASTM F3128.

5. A pipe structure comprising:
   an outer layer of a skin material having a first thickness, the outer layer defining an outside diameter of the pipe structure;
   an inner layer of a skin material having a second thickness, the inner layer defining an inside diameter of the pipe structure; and
   a core layer of a foam material disposed between the inner and outer layers, the core layer having a third thickness,
   wherein the inner, outer, and core layers are formed such that the pipe structure has a tube shape in cross-section,
   wherein the first, second, and third thicknesses, respectively, of the outer, inner, and core layers combine to define a wall thickness of the pipe structure,
   wherein the pipe structure has improved cold impact performance,
   wherein the inside diameter is greater than two (2) inches,
   wherein a ratio of the first thickness plus the second thickness compared to the third thickness is about 30/70 and 40/60, and
   wherein a specific gravity of the pipe structure is at least 1.0.

6. The pipe structure of claim 5, wherein the ratio is about 33/67.

7. The pipe structure of claim 5, wherein a formulation of the skin material of the inner and outer layers has at least one (1) PHR of an impact modifier.

8. The pipe structure of claim 5, wherein the pipe structure is formed according to the dimensional requirements of ASTM F3128.

9. A pipe structure comprising:
   an outer layer of a skin material having a first thickness, the outer layer defining an outside diameter of the pipe structure;
   an inner layer of a skin material having a second thickness, the inner layer defining an inside diameter of the pipe structure; and
   a core layer of a foam material disposed between the inner and outer layers, the core layer having a third thickness,
   wherein the inner, outer, and core layers are formed such that the pipe structure has a tube shape in cross-section,
   wherein the first, second, and third thicknesses, respectively, of the outer, inner, and core layers combine to define a wall thickness of the pipe structure,
   wherein the pipe structure has improved cold impact performance, and
   wherein foam material of the core layer is a closed-cell poly(vinyl chloride) (PVC) foam.

10. The pipe structure of claim 9, wherein a ratio of the thickness of the inner layer compared to the thickness of the outer layer of skin material is about 1 to 1.

11. The pipe structure of claim 9, wherein a ratio of the thickness of the inner layer compared to the thickness of the outer layer of skin material is less than 1 to 1.

12. A pipe structure comprising:
   an outer layer of a skin material having a first thickness, the outer layer defining an outside diameter of the pipe structure;
   an inner layer of a skin material having a second thickness, the inner layer defining an inside diameter of the pipe structure; and
   a core layer of a foam material disposed between the inner and outer layers, the core layer having a third thickness,
   wherein the inner, outer, and core layers are formed such that the pipe structure has a tube shape in cross-section,
   wherein the first, second, and third thicknesses, respectively, of the outer, inner, and core layers combine to define a wall thickness of the pipe structure,
   wherein the pipe structure has improved cold impact performance, and
   wherein a degree of fusion of the material of at least the inner and outer layers of skin material is between about 70% and about 90%.

13. A pipe structure comprising:
   an outer layer of a skin material having a first thickness, the outer layer defining an outside diameter of the pipe structure;
   an inner layer of a skin material having a second thickness, the inner layer defining an inside diameter of the pipe structure; and
   a core layer of a foam material disposed between the inner and outer layers, the core layer having a third thickness,
   wherein the inner, outer, and core layers are formed such that the pipe structure has a tube shape in cross-section,
   wherein the first, second, and third thicknesses, respectively, of the outer, inner, and core layers combine to define a wall thickness of the pipe structure,
   wherein the pipe structure has improved cold impact performance, and
   wherein a degree of fusion of the material of the core layer is between about 70% and about 90%.

14. The pipe structure of claim 13, wherein a degree of fusion of the material of at least the inner and outer layers of skin material is between about 70% and about 90%.

15. The pipe structure of claim 9, wherein the tube shape is round or circular.

16. The pipe structure of claim 9, wherein the skin material of the inner and outer layers is PVC.

17. The pipe structure of claim 1, wherein the pipe structure is formed according to the dimensional requirements of ASTM F628.

18. The pipe structure of claim 5, wherein the pipe structure is formed according to the dimensional requirements of ASTM F628.

19. The pipe structure of claim 5, wherein the specific gravity of the pipe structure is less than 1.4.

\* \* \* \* \*